United States Patent [19]
Carimali et al.

[11] Patent Number: 6,032,901
[45] Date of Patent: Mar. 7, 2000

[54] LINKAGE SYSTEM FOR AN AIRCRAFT TURBOJET ENGINE

[75] Inventors: Félix Carimali; Jean-Paul René André Hogie, both of Le Havre; Xavier Raymond Yves Lore, Beuzeville La Grenier; Pascal Gérard Rouyer, Saint Aubin Routot, all of France

[73] Assignee: Societe Hispano-Suiza, France

[21] Appl. No.: 08/969,360

[22] Filed: Nov. 28, 1997

[30] Foreign Application Priority Data

Nov. 28, 1996 [FR] France .................................. 96 14564

[51] Int. Cl.⁷ ...................................................... B64C 1/14
[52] U.S. Cl. .......................................... 244/129.4; 292/34
[58] Field of Search ................................ 292/34, 37, 140, 292/165, 170; 244/129, 128.4, 53 R, 54

[56] References Cited

U.S. PATENT DOCUMENTS

| | | | |
|---|---|---|---|
| 1,094,962 | 4/1914 | Arens et al. | 292/333 |
| 3,061,349 | 10/1962 | Dellith . | |
| 4,227,723 | 10/1980 | Rosell | 292/34 |
| 4,365,775 | 12/1982 | Glancy . | |
| 4,549,708 | 10/1985 | Norris . | |
| 4,555,078 | 11/1985 | Grognard | 244/54 |
| 4,613,099 | 9/1986 | Smith et al. . | |
| 4,679,750 | 7/1987 | Burhans . | |
| 4,793,643 | 12/1988 | Ahad et al. | 292/241 |
| 5,378,029 | 1/1995 | Hoffeins | 292/30 |
| 5,775,639 | 7/1998 | Fage | 244/110 B |

FOREIGN PATENT DOCUMENTS 2 267 122  11/1993  United Kingdom .
2 288 578  10/1995  United Kingdom .

*Primary Examiner*—Galen L. Barefoot
*Attorney, Agent, or Firm*—Bacon & Thomas PLLC

[57] ABSTRACT

A linkage system is disclosed for releasably latching a thrust reverser to an engine casing having a longitudinal axis, the linkage system having a seat on the thrust reverser and a movable latching member on the engine casing movable between an open position in which the latching member is displaced away from the seat, and a closed position in which the latching member is located adjacent to the seat so as to prevent displacement of the thrust reverser away from the engine casing.

21 Claims, 6 Drawing Sheets

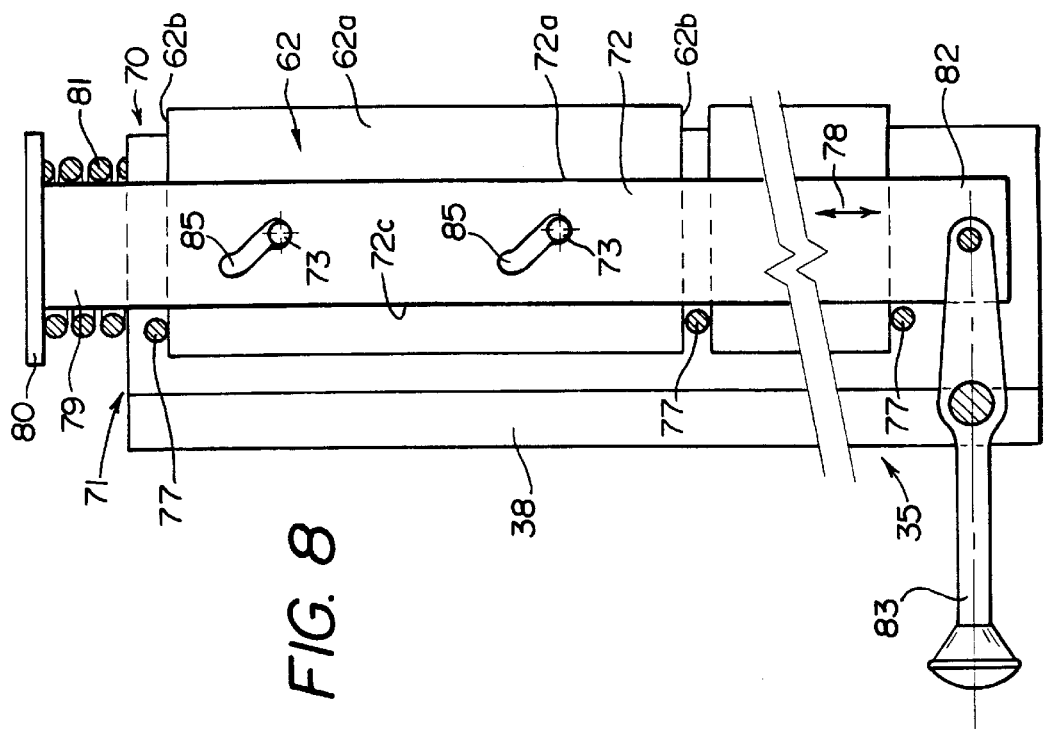
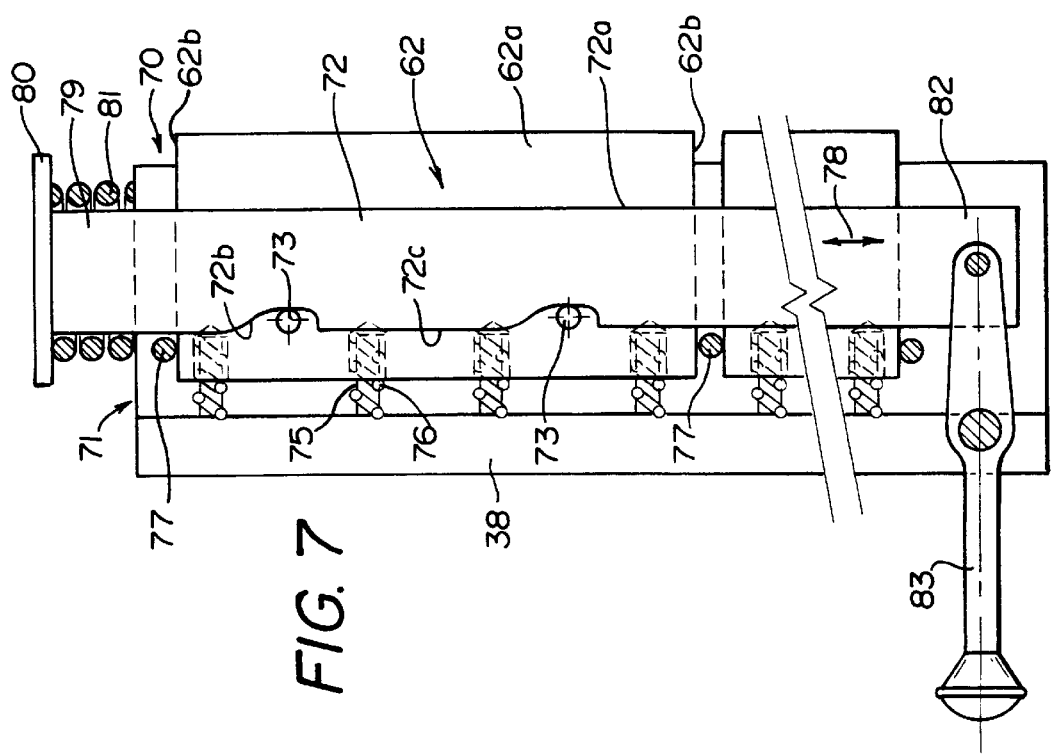

LINKAGE SYSTEM FOR AN AIRCRAFT TURBOJET ENGINE

BACKGROUND OF THE INVENTION

The present invention relates to a linkage system for releasably latching a portion of an aircraft engine cowling to an engine casing, more particularly, such a linkage system for latching the portion of the aircraft engine cowling having a jet engine thrust reverser.

An aircraft jet engine power plant typically is enclosed by a cowling and is attached to the aircraft structure by a supporting strut. The cowling generally assumes the shape of a body of revolution about a longitudinal axis of the jet engine to provide aerodynamic airflow thereby minimizing the drag of the jet engine. The cowling may comprise several functional units, including a thrust reverser mounted to the rear of the jet engine. In order to minimize the weight of the cowling, it is typically fabricated from sheet metal and, even though stiffeners are incorporated into the cowling, it may deform during operation of the thrust reverser due to the high magnitude of forces imposed on the cowling.

In order to facilitate access to the jet engine, to the mechanical components of the thrust reverser and to make removal of the jet engine easier, the cowling, particularly the thrust reverser section, is designed in opposite C-shaped sections half clamshells along a vertical plane passing through the longitudinal axis of the jet engine. Typically, the half clamshells are pivotally attached to either the engine or the support strut structure enabling the two sections to be pivoted away from each other by moving the bottoms apart. The half clamshells are locked together at their displaceable ends when in their closed positions to form part of the engine cowling.

To decelerate the aircraft, the thrust reverser temporarily deflects at least a portion of the propellant gas flow toward an upstream direction and is thereby subjected to a large reaction force from the front towards the rear and extending generally parallel to the jet engine longitudinal axis. In order to prevent damage to the hinges linking the half clamshells of the thrust reverser to the support strut from this large reaction force and to preserve the half clamshells from stresses that may buckle the sheet metal, the half clamshells are also linked, when in their closed positions, to an outer casing of the jet engine by mutual engagement of two annular linkage elements, the engagement taking place in a plane extending substantially perpendicular to the longitudinal engine axis. The linkage element on the engine casing is stationary, while the engaging portion is attached to the inner side of the half clamshells. The stationary linkage element may have an annular notch, typically having a U- or V-shaped cross-sectional configuration in which the opening points radially outwardly away from the longitudinal axis of the engine. The engaging portions mounted on the half clamshells have shapes complimentary to the annular notch of the fixed linkage element and engage this notch when the half clamshells are in their closed positions.

Although in this known design, the axial reaction force is uniformly spread over the circumference of the external casing of the jet engine and of the half clamshells, the deformation of the cowling or any component thereof, in particular when subjected to centrifugal or radial forces, may lead to the disengagement of the movable linkage element from the notch and thereby separate the thrust reverser from the jet engine. Dynamic imbalance of the jet engine may also cause such a disengagement. The solution to this problem must be carried out without hampering the intentional opening of the half clamshells and without adding undue weight to the jet engine or to the cowling.

SUMMARY OF THE INVENTION

A linkage system is disclosed for releasably latching a thrust reverser to an engine casing having a longitudinal axis, the linkage system having a seat on the thrust reverser and a movable latching member on the engine casing which is movable between an open position in which the latching member is displaced away from the seat, and a closed position in which the latching member is located adjacent to the seat so as to prevent displacement of the thrust reverser away from the engine casing, the latching member moving between the open and closed positions in a direction generally parallel to the longitudinal axis of the engine casing.

The linkage system may orient the seat on the thrust reverser to face radially outwardly away from the longitudinal axis of the casing and include a control device in which a plurality of latching members are utilized and are actuated simultaneously by the control device. When the latching members are in the closed positions, they prevent disengagement of the linkage elements on the thrust reverser from the groove on the engine casing, even when subjected to the forces of the thrust reverser.

The strength of the linkage system compensates for the limited rigidity of the half clamshells. This effect is enhanced by regularly distributing the movable latching members at an adequate density around the circumference of the engine casing. As a result, it is possible to either operate the thrust reverser at higher levels, thereby encountering higher stresses, or to operate the thrust reverser at the previous levels and to reduce the mechanical strength and, inherently, the weight of the cowling. The linkage system according to the present invention quickly moves the latching members into their open positions and does not hamper the intentional opening of the half clamshells.

Biasing elements, such as springs, are incorporated into the linkage system to bias latching members toward their closed positions in order to prevent premature or unintentional latching member displacement away from the closed position, which may be caused by cowling vibrations, and to preclude failure to reset the latching members in their closed positions following closure of the half clamshells.

BRIEF DESCRIPTION OF THE DRAWINGS

FIG. 7 is an internal view of the linkage system illustrated in FIG. 6.

FIG. 8 is a view similar to FIG. 7 illustrating a variation of the embodiment illustrated in FIG. 6.

DETAILED DESCRIPTION OF THE PREFERRED EMBODIMENTS

Figure 1:
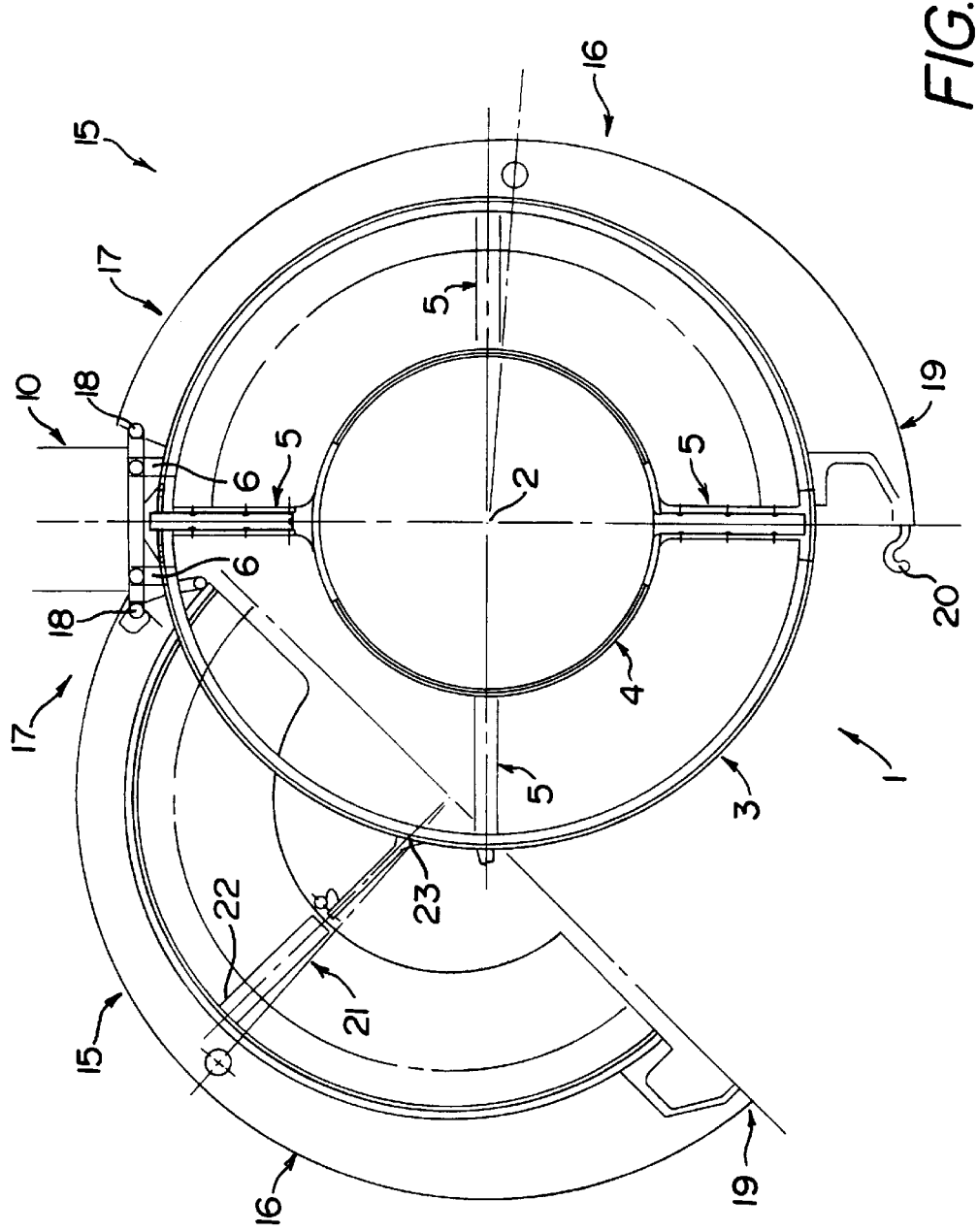
FIG. 1 is a front view of an engine assembly illustrating one of the half clamshells in an open position.

As illustrated in FIG. 1, the jet engine 1 has a longitudinal axis 2 and is enclosed by an external casing 3 which, in this particular instance, comprises a fan casing of a turbo-fan type jet engine. An inner casing 4 is connected by a plurality of arms 5 to the external casing 3, the casings 3 and 4 assuming a shape of a surface of revolution about the longitudinal axis 2. The jet engine 1 is attached by a set of link rods 6 to a support strut 10 attached to the aircraft (not shown).

A thrust reverser portion 15 of the cowling comprises two C-shaped sections or half clamshells 16 each having an end 17 pivotally attached to the support strut 10 by hinges 18 having a pivot axis extending generally parallel to the longitudinal axis 2. The half clamshells 16 are mutually interlocked in their closed positions at their free ends 19 by locks 20. Each of the half clamshells 16 is kept in the open position by a strut 21 having one end 22 pivotally attached to the half clamshells 16 and a second end attached to the external casing 3 at 23.

Figure 2:
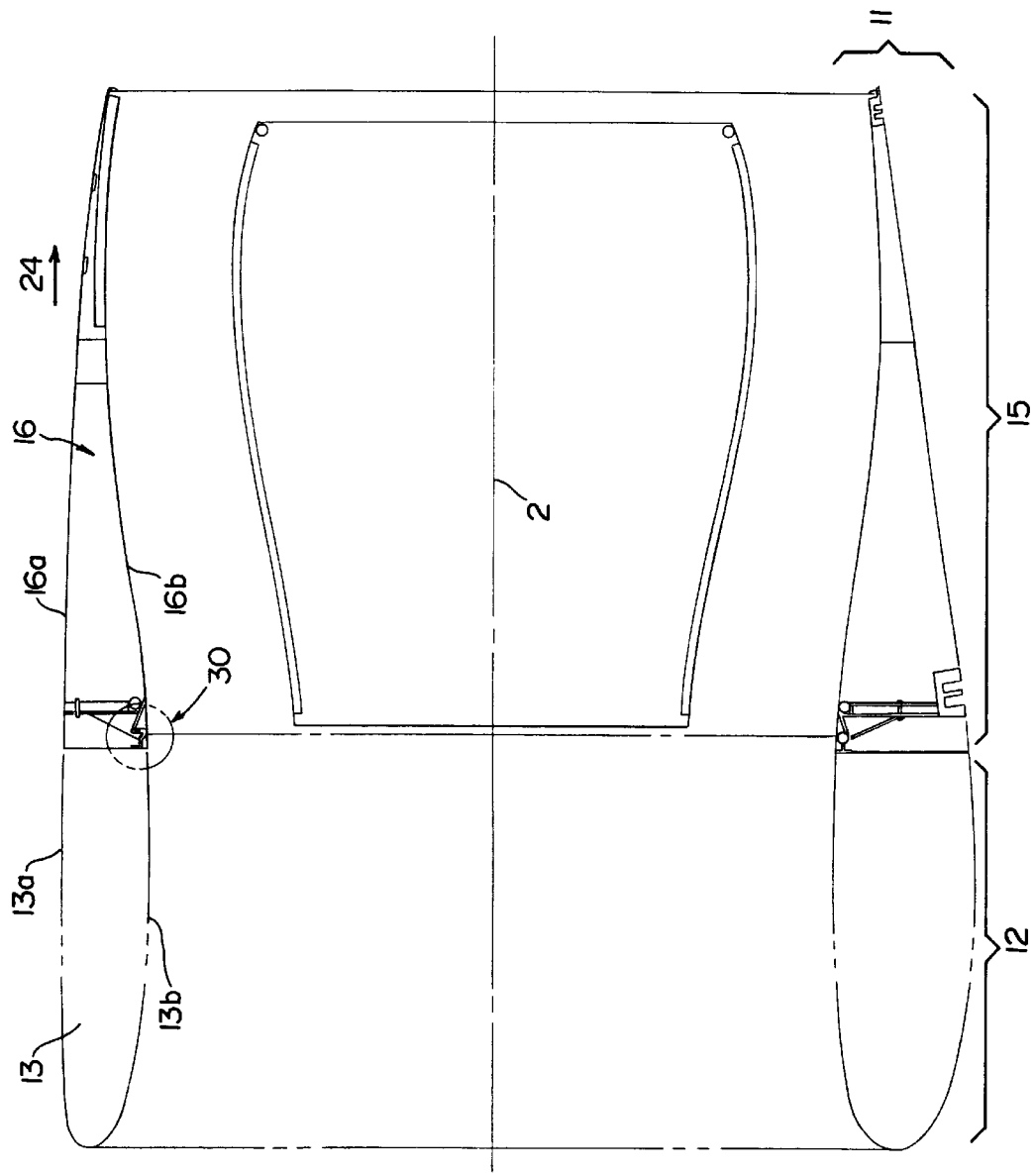
FIG. 2 is a longitudinal, cross-sectional view of an engine casing and cowling incorporating the linkage system according to the present invention.

In FIG. 2, it can be seen that the cowling 11 has rear portions containing the thrust reverser 15 composed of the two half clamshells 16, and a front portion forming an air intake 12 similarly composed of two C-shaped sections 13, of which the inner and outer walls 13a and 13b form aerodynamic surfaces located substantially flush with the inner and outer walls 16a and 16b of the half clamshells 16. Because the operation of the thrust reverser 15 subjects the cowling to a large reaction force 24 acting in the direction from the front of the cowling towards the rear, the assembly of the jet engine 1 and the thrust reverser 15 also includes a linkage system 30 to transmit the reaction force 24 to the external engine casing 3, thereby preventing deformation of the engine cowling.

Figure 3:
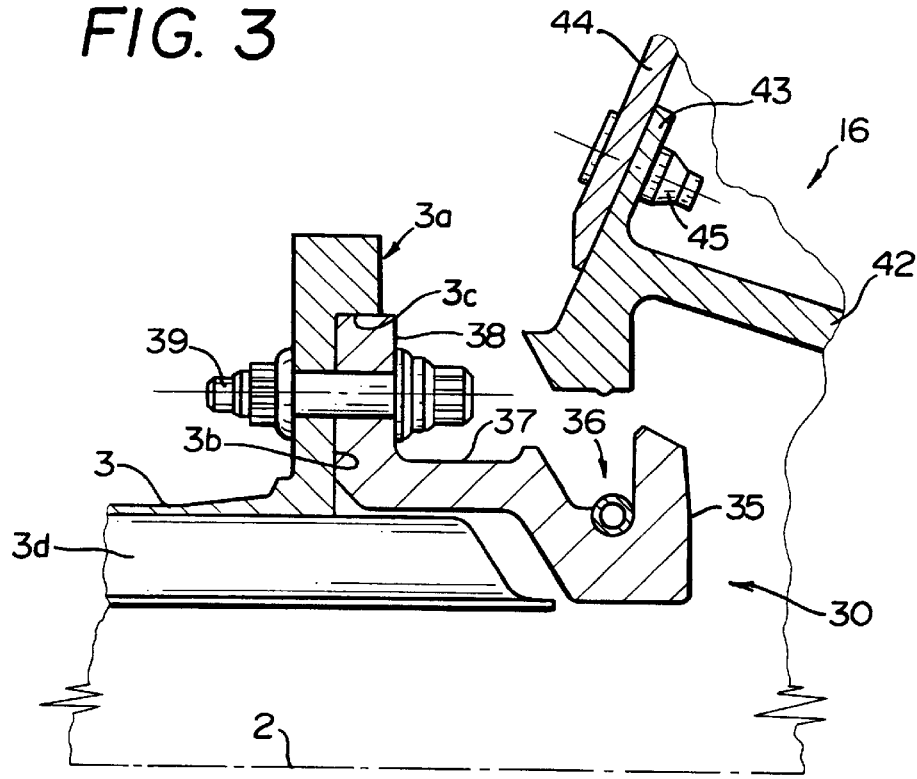
FIG. 3 is an enlarged, partial, cross-sectional view showing the mutual engagement of the notch and the corresponding engagement portion of a linkage system.

As seen in FIG. 3, the external casing 3 has an annular bracket 3a extending radially outwardly from a rear portion. The annular bracket 3a has a rearwardly facing surface 3b extending substantially perpendicular to the longitudinal axis 2, the surface 3b being bounded radially outwardly by a shoulder 3c. The inner wall of the casing 3 is clad with acoustic tiles 3d in known fashion.

The linkage system 30 comprises an annular, stationary, inner latching element 35 rigidly affixed to the external casing 3 by attaching bracket portion 38 to the annular bracket 3a such that the bracket portion 38 bears against surface 3b. Bolts 39 attach the bracket portion 38 to the bracket 3a. The latching element 35 also comprises a generally cylindrical segment 37 extending from the bracket portion 38 and an annular notch 36 facing generally radially outwardly away from the longitudinal axis 2. Bolts 39 are uniformly distributed over the entire circumference of the bracket 3a and the bracket portion 38 thereby transferring forces applied to the latching element 35 via the notch 36 to the engine casing 3.

Linkage system 30 also comprises outer latching elements 40 each having a step 41 rigidly affixed to one of the half clamshells 16, the step 41 having a complimentary shape to the notch 36 and located so as to enter the notch 36 when the half clamshells 16 are in their closed positions. An elastomeric O-ring 47 is located at the bottom of the notch 36 and is contacted by the step 41 to hermetically seal the half clamshells 16 to the external casing 3. Step 41 also extends longitudinally by bracket portion 42 that is bolted or otherwise affixed to the half clamshells. The step 41 also extends outwardly by second bracket portion 43 that is affixed to the half clamshells 16 by bolts 45 and fitting 44.

Figure 4:
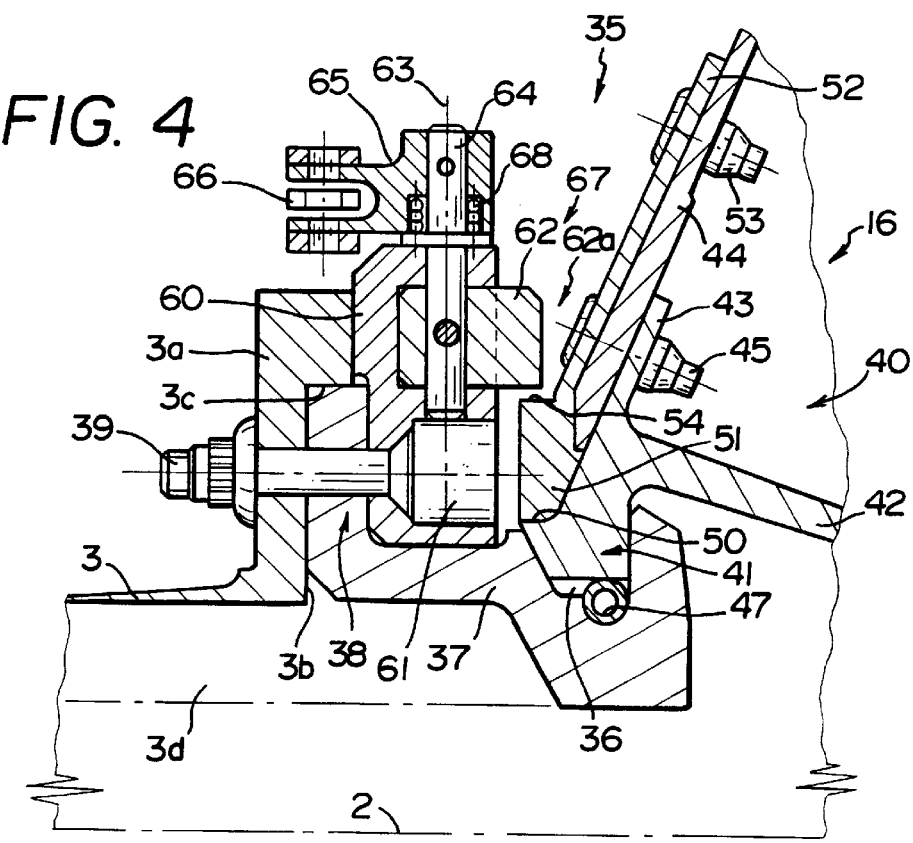
FIG. 4 is a partial, longitudinal, cross-sectional view of a first embodiment of a linkage system according to the present invention.

As best seen in FIG. 4, the step 41 has a seat 50 with a generally arcuate configuration centered about the longitudinal axis 2, the seat 50 facing radially outwardly away from longitudinal axis 2. A shim 51 is mounted against the seat 50 by mounting portion 52 being attached to the fitting 44 by bolts 45 and 53. The shim 51 comprises a seat 54, again having an arcuate configuration centered on the longitudinal axis 2 and facing radially outwardly away from axis 2. The purpose of shim 51 is to provide a seat 54, equivalent to the seat 51, but located radially outwardly from the seat 50. It is to be understood, however, that shim 51 may be deleted and that the linkage system may engage the seat 50 rather than the seat 54.

Fixed latching element 60 is sector shaped and centered on the longitudinal axis 2 and is fixedly attached to the stationary latching element 35 so as to bear against the cylindrical portion 37 and the bracket portion 38. Bolts 39 may be utilized to attach the latching element 60 to the latching element 35. The heads of the bolts 39 may be countersunk into the latching element 60 by clearances 61. A plurality of latching members 62 are pivotally mounted on the latching element 60 so as to pivot about pivot axis 63 extending radially from the longitudinal axis 2. The latching members 62 are each pinned onto a hinge shaft 64 that is pivotally mounted in the latching element 60 so as to pivot about axis 63. Hinge shaft 64 may project outwardly beyond the latching element 60 so as to be attached to an actuating fork 65 which is affixed to the hinge shaft and a pin, or the like. The fork 65 is connected to control element 66 such that actuation of the control element causes the latching members 62 to pivot about axis 63 between a closed position, illustrated in FIG. 4 wherein the latching member 62 is adjacent to the seat 54 and an open position wherein the latching member 62 is displaced away from the seat 54.

Latching member 62 is housed in a clearance 67 in the latching element 60, such clearance being traversed by the hinge shaft 64 such that the latching member 62 is positioned by the opposite walls of the clearance 67 so as to enable pivoting movement of the latching member 62. Latching member 62 also comprises an end 62a located adjacent to the seat 54 when the latching member 62 is in the closed position, the end 62a being moved into the clearance 67 when the latching member 62 is in the open position.

A helical torsion spring 68 extends around shaft 64 and has two arms, one arm affixed to the latching element 60 and the opposite arm to the actuating fork 65 such that the spring exerts a biasing force on the latching members 62 so as to bias the end 62a of the latching member 62 towards its position adjacent to the seat 54. In this position, the step 41 may not be disengaged from the notch 36 and, thus, the half clamshells 16 are prevented from opening.

In a variation of the embodiment illustrated in FIG. 4, the bolts 39 are circumferentially offset from the hinge shafts 64 enabling the latching element 60 to have a lesser radial height such that clearance 67 coincides with clearance 61 thereby locating the end 62a of the latching member 62 above the seat 50. In this variation, the shim 51 may be eliminated.

Figure 5:
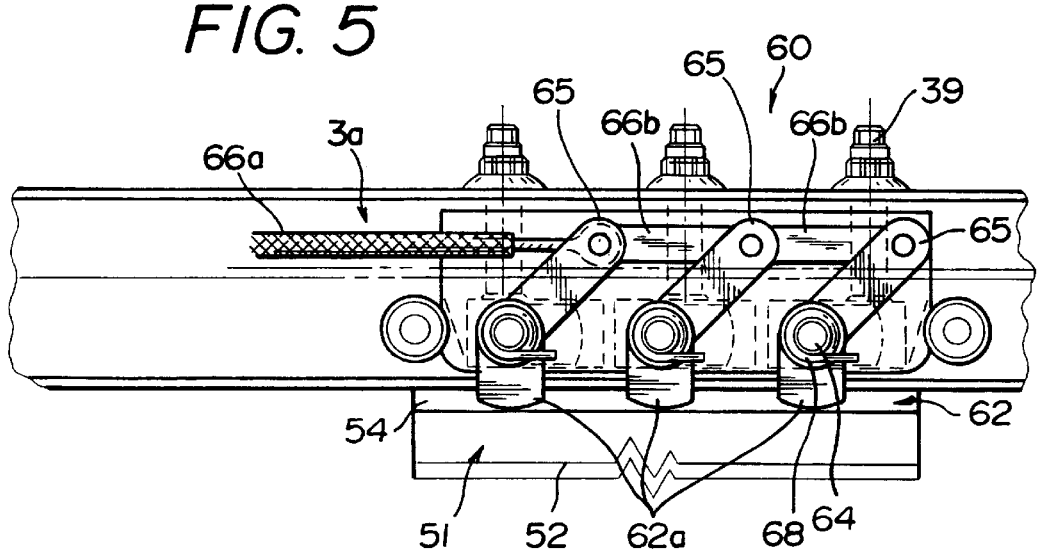
FIG. 5 is a partial, external view of the linkage system illustrated in FIG. 4.

As illustrated in FIG. 5, each latching element 60 may comprise a plurality of latching members 62. Although FIG. 5 illustrates three such latching members, it is to be understood that more or less than this number may be utilized without exceeding the scope of this invention. Each of the latching members 62 is biased towards the closed position by springs 68 and are moved to the open position by control element 66 comprising cable 66a connected to a link rod 66b which is, in turn, connected to the forks 65.

Figure 6:
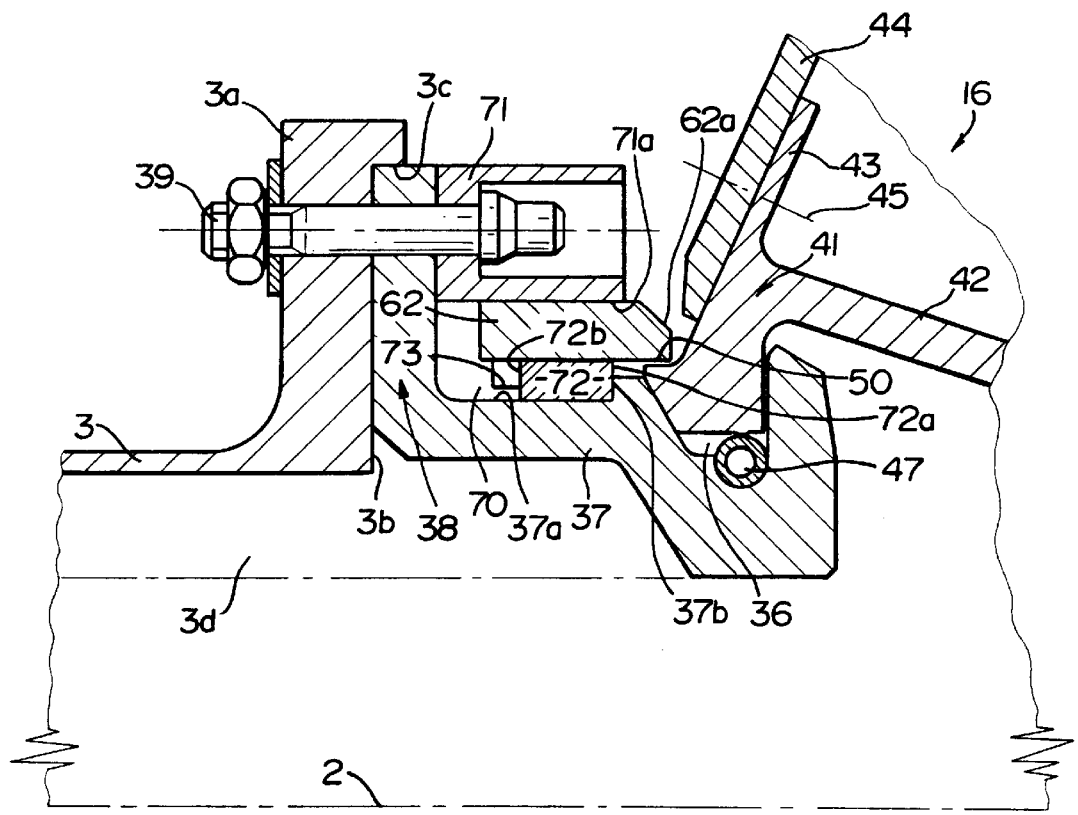
FIG. 6 is a view similar to FIG. 4, but illustrating a second embodiment of the linkage system according to the present invention.

An alternative embodiment of the linkage system mechanism of the present invention is illustrated in FIGS. 6–8. In this embodiment, the latching member 62 slides in a direction substantially parallel to the longitudinal axis in space 70. As can be seen, the end 62a of the latching member 62 when in the closed position will be located closely adjacent to the seat 50 to prevent disengagement of the step 41 from the groove 36. The space 70 is bounded by the outer surface 37a of the cylindrical portion 37 and by an inner surface 71a of a guide 71 connected to the bracket 38 by bolts 39. The surfaces 37a and 71a constitute generally cylindrical surface portions mutually parallel to each other and parallel to the longitudinal axis 2. A cam 72 is located between the latching member 62 and the surface 37a. The cam member 72 and the latching member 62 slide with very little clearance against each other between the two surfaces 37a and 71a. The cylindrical portion 37 also comprises a shoulder 37b against which one edge 72a of the cam member 72 bears. An opposite side 72c has cam surfaces 72b thereon which are in contact with cam followers 73 extending downwardly from the latching member 62. As can be seen, when the cam member 72 is moved in a direction generally perpendicular to the plane of FIG. 6, cam surfaces 72b interacting with the cam followers 73 cause longitudinal sliding movement of the latching member 62 so as to move it between its open and closed positions. Again, when the latching member 62 is in the closed position, end portion 62a is located closely adjacent to the seat 50 thereby preventing disengagement of the step 41 from the notch 36.

As best seen in FIG. 7, a plurality of generally cylindrical rods 75 extend from the bracket 38 generally parallel to the longitudinal axis 2 and slidably enter bore holes formed in the latching member 62. Helical springs 76 are mounted around the rods 75 and extend between the bracket portion 38 and the latching member 62 so as to bias the latching member 62 towards the closed position. As can also be seen, the cam followers 73 engage cam surfaces 72b and the latching member 62 comprises a generally rectangular configuration in which one side 62a extends along its length and ends 62b extend along the width. Movement of the latching member 62 between the open and closed positions is guided by the two opposite ends 62b slidably engaging studs 77 extending upwardly from the cylindrical portion 37 of the bracket 35.

Helical springs 76 urge the latching member 62 toward the closed position, the latching member 62 in turn pushing the cam 72 against the shoulder 37b by engagement of the cam followers 73 and the cam surfaces 72b. When the cam 72 is displaced in the direction of arrow 78 in FIG. 7, the latching member 62 is prevented from movement in this direction by the studs 77. Such movement of the cam 72 causes the latching member 62 to slide in directions perpendicular to the direction 78. The distance between the studs 77 and the shoulder 37b will be slightly larger than the width of the cam 72 (the distance between side 72a and side 72c) so as to enable movement of the cam 72. The cam 72 has an end 79 projecting beyond the slide space 70. The end 79 has a shoulder 80 and a spring 81 extending between the shoulder 80 and the edge of the slide space 70 to bias the cam 72 into a position corresponding to the closed position of the latching members 62.

Cam 72 may comprise an opposite end 82 to which is connected an actuating lever 83 which is also pivotally attached to the fixed structure. As can be seen in FIG. 7, movement of the lever 83 about its pivot axis will cause corresponding movement of the cam 72 in the direction of arrow 78, thereby moving the latching member 62 between the open and closed positions.

Preferably, the latching member 62 has a length between the opposite ends 62b that is at least twice the width. Also, the cam followers 73 should be widely spaced apart to ensure stable positioning of the latching member 62.

A variation of this embodiment is illustrated in FIG. 8. This variation functions exactly as the previously described variation and is the same, except that cam 72 has cam slots 85 formed between its opposite sides 72a and 72c. As can be seen, the cam followers 73 are located so as to engage the elongated, oblique cam slots 85. In this variation, movement of the lever 83 about its pivot axis causes movement of the cam 72 in the direction of arrow 78 which movement, in turn, moves the latching members 62 between their open and closed positions.

The plurality of latching members 62 separated by guiding studs 77 are uniformly distributed throughout the circumference of the engine casing 3 in order to cover the seat 50 of the step 41 and thereby preclude disengagement of the step 41 from the notch 36 regardless of the circumferential rigidity of the half clamshells 16.

Figure 9:
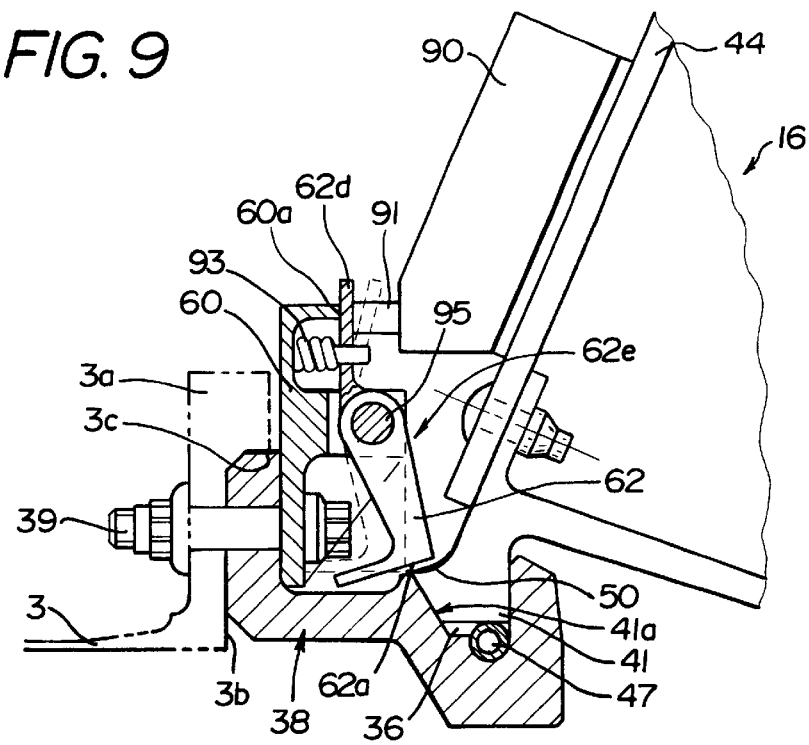
FIG. 9 is a longitudinal, partial, cross-sectional view illustrating a third embodiment of the linkage system according to the present invention.

An alternative embodiment of the present invention is illustrated in FIG. 9. In this embodiment, the movement of the latching element 62 is controlled by a lock 90 which may be hydraulically, pneumatically or electrically actuated. Actuating the lock 90 extends piston 91 so as to drive the end 62d of the latching member 62 into rotation about a shaft 95 extending substantially perpendicularly to the plane of the drawing, until the end 62d comes to a stop against wall 60a of the latching element 60. Such movement of the end 62d moves the end 62a of the latching member 60 adjacent to the seat 50, thereby preventing disengagement of the step 41 from the notch 36.

When the lock is deactivated, the piston 91 is retracted enabling spring 93 bearing against the latching element 60 and the end 62a, to pivot the latching member 62 around the shaft 95 moving the end 62a away from the seat 50, thereby enabling the opening of the half clamshells 16.

As a variation, the lock 90 may have a piston 91 that is maintained in the extended position by a mechanical system, such as a compression spring, and pressing against the end 62d which has a ramp opposite the piston 91 enabling the positioning of the latching member 62 such that the step 41 will be prevented from disengagement from the notch 36. In such a variation, actuating the lock 90 would retract the piston 91, thereby allowing the latching member 62 to be moved to the open position by springs 93.

The control of the lock 90 may be combined with the control logic for the thrust reverser, or that of the aircraft. However, the control logic of the lock 90 may also be combined with that for the cowling actuators, allowing opening of the half clamshells 16 that is manual and/or independent of the thrust reverser control system. In such an instance, the latching member 62 is kept in the locked position solely due to the action of the springs 93 which will then be located radially inwardly of the shaft 95. In this variation, the lock 90 would be utilized to move the latching members 62 to their open positions thereby permitting the opening of the half clamshells 16. In this variation, the latching members 62 would be moved to their closed positions when the half clamshells are open and would be moved to their closed positions by sides 41a of the step 41 as the half clamshells are moved to their closed positions. Once the step 41 engages the groove 36, the latching member 62 would then be biased by springs 93 to automatically return to their closed positions.

Figure 10:
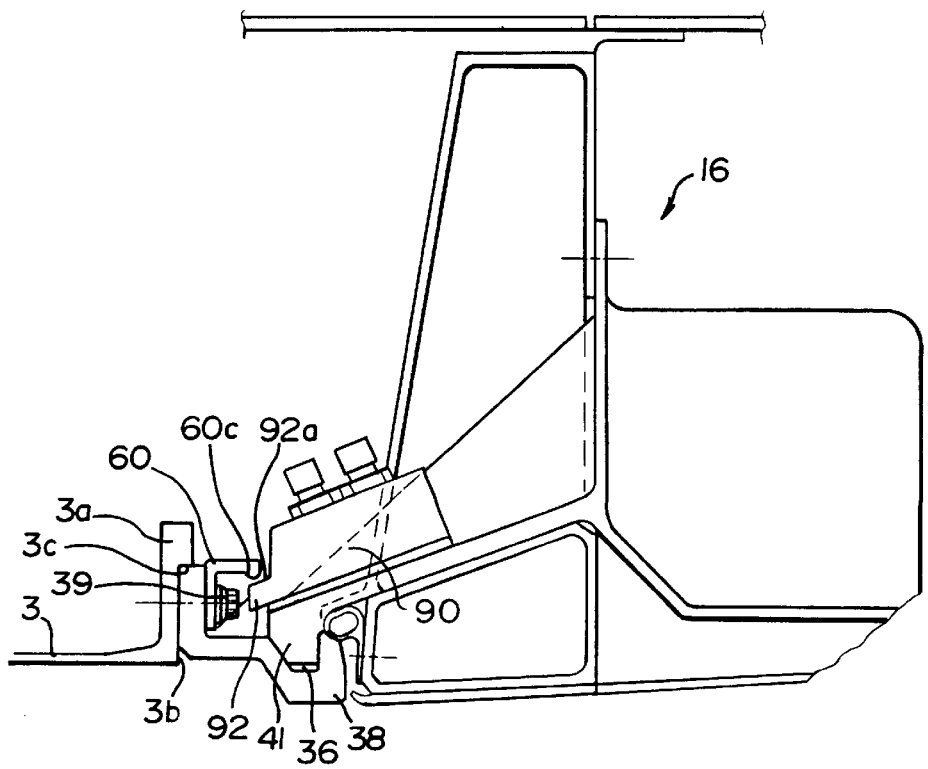
FIG. 10 is a longitudinal, cross-sectional view illustrating a fourth embodiment of the linkage system according to the present invention.

Another embodiment is illustrated in FIG. 10. In this embodiment, the lock 90, which may be a hydraulically actuated lock, when actuated, extends piston 92 which directly engages the seat 60c of the latching element 60 thereby preventing disengagement of the step 41 from the notch 36. A plurality of locks 90 are circumferentially distributed around the cowling portions Although a hydraulically actuated lock 90 was discussed in reference to the embodiments in FIGS. 9 and 10, it is to be understood that such locks may be pneumatically actuated, or electrically actuated. Also, the locations of the step 41 and the notch 36 may also be interchanged such that the step is located on the engine casing, while the notch 36 is located on the half clamshells.

The foregoing description is provided for illustrative purposes only and should not be construed as in any way limiting this invention, the scope of which is defined solely by the appended claims.

What is claimed is:

1. A linkage system for an aircraft turbojet engine equipped with a thrust reverser, the linkage system comprising:
   a turbojet engine (1) having an external casing (3) and a longitudinal axis (2);
   a thrust reverser comprising two half clamshells (16) mounted around the turbojet engine (1) and its external casing (3);
   at least one annular inner linkage element (35) rigidly affixed to the external casing (3);
   at least one annular outer linkage element (40) rigidly affixed to each of the clamshells (16), the outer linkage elements (40) each comprising a radially outwardly facing seat (50); and
   a plurality of movable latching members (62) mounted on the external casing (3), the latching members (62) being movable between a closed position in which one end (62a) of each latching member (62) is located radially outwardly above a respective one of the seats (50) and an open position in which the one end (62a) of each latching member (62) is not located radially outwardly above the respective seat (50), the movement of each of the latching members (62) substantially taking place in a plane perpendicular to a straight line which is radial to the longitudinal axis (2) and passes through the respective seat (50) where a respective one of the latching members (62) covers the respective seat (50);
   wherein the clamshells (16) are axially connected to the external casing (3) by a mutual radial penetration of the at least one inner linkage element (35) and the at least one outer linkage element (40), the mutual radial penetration substantially taking place in a plane perpendicular to the longitudinal axis (2) such that movement of the latching members (62) into the closed position prevents the outer linkage elements (40) from moving radially away from the inner linkage elements (35).

2. The linkage system according to claim 1, wherein the latching members (62) are regularly distributed at an adequate linear density over a circumference of the external casing (3).

3. The linkage system according to claim 1, further comprising:
   a control device (66) which simultaneously moves the plurality of latching members (62).

4. The linkage system according to claim 1, further comprising:
   a corresponding plurality of biasing devices acting on the plurality of latching members (62) to bias the latching members (62) into the closed position.

5. The linkage system according to claim 1, further comprising:
   a plurality of radial hinge shafts (64) on which the latching members (62) are pivotably mounted to move between the open and closed positions.

6. The linkage system according to claim 5, further comprising:
   a helical spring (68) mounted concentrically with each hinge shaft (64) and acting on a corresponding one of the latching members (62) to bias the corresponding latching member (62) into the closed position.

7. The linkage system according to claim 6, further comprising:
   a control lever; and
   a cable (66a) connected to the control lever;
   wherein the latching members (62) comprise levers having free ends which are connected to the cable (66a) such that the control lever and the cable (66a) comprise a control device for moving the latching members (62) between the open and closed positions.

8. The linkage system according to claim 1, further comprising:
   a plurality of annular slides (70) in which the latching members (62) are slidable so as to move between the open and closed positions.

9. The linkage system according to claim 8, further comprising:
   a plurality of linear cam members (72) which are situated in the annular slides (70) and drive the latching members (62) between the open and closed positions.

10. The linkage system according to claim 9, wherein each of the cam members (72) has a cam surface thereon and each of the latching members (62) has a cam follower thereon which is in contact with the cam surface of a corresponding one of the cam members (72).

11. The linkage system according to claim 10, wherein the cam surface is formed on an edge of the cam member (72).

12. The linkage system according to claim 10, wherein the cam surface is formed by a slot in the cam member (72).

13. The linkage system according to claim 9, further comprising:
   a cam biasing device acting on each of the cam members (72) such that the latching members (62) are biased into the closed position.

14. The linkage system according to claim 9, further comprising:
   at least one first biasing device acting on each of the latching members (62) such that the latching members (62) are biased toward the closed position; and,
   a second biasing device acting on each of the cam members (72).

15. The linkage system according to claim 1, further comprising:
   at least one actuator (90) located on the thrust reverser which moves the latching members (62) between the open and closed positions.

16. The linkage system according to claim 15, wherein the at least one actuator (90) comprises an electric actuator.

17. The linkage system according to claim 15, wherein the lat least one actuator (90) comprises a hydraulic actuator.

18. The linkage system according to claim 15, wherein the at least one actuator 90 comprises a pneumatic actuator.

19. A linkage system for an aircraft turbojet engine equipped with a thrust reverser, the linkage system comprising:

- a turbojet engine (1) having an external casing (3) and a longitudinal axis (2);
- a thrust reverser comprising two half clamshells (16) mounted around the turbojet engine (1) and its external casing (3);
- at least one annular inner linkage element (35) rigidly affixed to the external casing (3), the inner linkage element (35) having a rest (60) with a seat (60c);
- at least one annular outer linkage element (40) rigidly affixed to each of the half clamshells (16), each of the outer linkage elements (40) supporting at least one lock (90) which directly controls a latch (92) having a seat (92a) to move the latch (92) between a closed position in which the seat (92a) of the latch (92) is located radially inwardly below the seat (60c) of the rest (60) and an open position in which the seat (92a) of the latch (92) is not located radially inwardly below the seat (60c) of the rest (60);

wherein the clamshells (16) are axially connected to the external casing (3) by a mutual penetration of the at least one inner linkage element (35) and the at least one outer linkage element (40), the mutual penetration substantially taking place in a plane perpendicular to the longitudinal axis such that movement of the latch (92) into the closed position prevents the at least one outer linkage element (40) from moving radially away from the at least one inner linkage element (35).

20. The linkage system according to claim 19, wherein the at least one lock (90) comprises a hydraulic actuator.

21. The linkage system according to claim 15, further comprising:

at least one thrust-reverser actuator for moving the half clamshells (16), the at least one thrust-reverser actuator having a control logic which is combined with that of the at least one actuator (90) which moves the latching members (62).

* * * * *

UNITED STATES PATENT AND TRADEMARK OFFICE
CERTIFICATE OF CORRECTION

PATENT NO. : 6,032,901
DATED : March 7, 2000
INVENTOR(S) : Felix CARIMALI et al.

It is certified that error appears in the above-indentified patent and that said Letters Patent is hereby corrected as shown below:

Column 1, line 26; change "half clamshells" to —or half clamshells split—

Column 2, line 8; delete "casing"

Column 5, lines 10 & 11; delete "mecha-nism"

Signed and Sealed this

Tenth Day of April, 2001

*Attest:*

NICHOLAS P. GODICI

*Attesting Officer*     *Acting Director of the United States Patent and Trademark Office*